(12) United States Patent
Klann

(10) Patent No.: US 10,783,805 B2
(45) Date of Patent: Sep. 22, 2020

(54) MICROCHANNEL DEVICE FOR CONTROLLING GAS, VAPOR, PRESSURE WITHIN A PACKAGE

(71) Applicant: LaserSharp FlexPak Services, LLC, St. Paul, MN (US)

(72) Inventor: Kenneth Klann, Vadnais Heights, MN (US)

(73) Assignee: LaserSharp FlexPak Services, LLC, Vadnais Heights, MN (US)

( * ) Notice: Subject to any disclaimer, the term of this patent is extended or adjusted under 35 U.S.C. 154(b) by 92 days.

(21) Appl. No.: 15/881,667

(22) Filed: Jan. 26, 2018

(65) Prior Publication Data

US 2019/0221140 A1  Jul. 18, 2019

Related U.S. Application Data

(60) Provisional application No. 62/617,542, filed on Jan. 15, 2018.

(51) Int. Cl.
*B65D 33/01* (2006.01)
*G09F 3/02* (2006.01)
*G09F 3/10* (2006.01)
*B32B 3/30* (2006.01)
*B32B 3/26* (2006.01)
*B23K 26/38* (2014.01)
*B23K 26/364* (2014.01)

(52) U.S. Cl.
CPC .................. *G09F 3/02* (2013.01); *G09F 3/10* (2013.01); *B23K 26/364* (2015.10); *B23K 26/38* (2013.01); *B32B 3/266* (2013.01); *B32B 3/30* (2013.01); *B32B 2250/02* (2013.01); *B32B 2307/416* (2013.01); *B32B 2307/726* (2013.01); *B32B 2519/00* (2013.01); *B65D 33/01* (2013.01); *G09F 2003/0201* (2013.01); *G09F 2003/0236* (2013.01); *G09F 2003/0257* (2013.01); *G09F 2003/0272* (2013.01); *G09F 2003/0283* (2013.01)

(58) Field of Classification Search
CPC .................................................... B65D 33/01
See application file for complete search history.

(56) References Cited

U.S. PATENT DOCUMENTS

| | | | |
|---|---|---|---|
| 3,937,396 | A | 2/1976 | Schneider |
| 4,121,595 | A | 10/1978 | Heitmann et al. |
| 4,134,535 | A | 1/1979 | Barthels et al. |
| 5,229,180 | A | 7/1993 | Littmann |

(Continued)

FOREIGN PATENT DOCUMENTS

| | | |
|---|---|---|
| EP | 0144011 B2 | 12/1992 |
| EP | 1340695 A1 | 9/2003 |

(Continued)

OTHER PUBLICATIONS

Agrawal et al, Simulation of Gas Flow in Microchannels With a Single 90 Degree Bend, Jan. 27, 2009, Sciencedirect, vol. 38, Issue 8, pp. 1629-1637, Discipline of Mechanical Engineering, University of Newcastle, Callaghan, NSW 2308, Australia.

(Continued)

*Primary Examiner* — William P Watkins, III
(74) *Attorney, Agent, or Firm* — Campbell IP Law LLC

(57) ABSTRACT

A label with a microchannel for venting a package.

17 Claims, 7 Drawing Sheets

(56) References Cited

U.S. PATENT DOCUMENTS

| | | | |
|---|---|---|---|
| 5,259,401 | A | 11/1993 | Lange et al. |
| 5,263,777 | A | 11/1993 | Domke |
| 5,427,839 | A | 6/1995 | Buchner et al. |
| 5,515,994 | A | 5/1996 | Goglio |
| 5,629,060 | A | 5/1997 | Garwood |
| 5,727,881 | A | 3/1998 | Domke |
| 5,782,266 | A | 7/1998 | Domke |
| 6,116,782 | A | 9/2000 | Arkins et al. |
| 6,662,827 | B1 | 12/2003 | Clougherty et al. |
| 6,663,284 | B2 | 12/2003 | Buckingham et al. |
| 7,083,837 | B1 | 8/2006 | Varriano-Marston |
| 7,178,555 | B2 | 2/2007 | Engel et al. |
| 7,490,623 | B2 | 2/2009 | Rypstra |
| 7,527,840 | B2 | 5/2009 | Zeik |
| 7,874,731 | B2 | 1/2011 | Turvey et al. |
| 8,038,023 | B2 | 10/2011 | Moore et al. |
| 8,197,138 | B2 | 6/2012 | Turvey |
| 8,226,878 | B2 * | 7/2012 | Huo .................. B23K 26/16 264/400 |
| 8,636,034 | B2 | 1/2014 | Hoffman et al. |
| 8,887,766 | B2 | 11/2014 | Stotkiewitz et al. |
| 9,174,308 | B2 | 11/2015 | Chow et al. |
| 9,187,229 | B2 | 11/2015 | Hoffman et al. |
| 2002/0054969 | A1 | 5/2002 | Clarke et al. |
| 2003/0029850 | A1 | 2/2003 | Varriano-Marston |
| 2004/0000336 | A1 | 1/2004 | Goglio |
| 2007/0042885 | A1 | 2/2007 | Rietjens et al. |
| 2007/0116915 | A1 | 5/2007 | Perre et al. |
| 2008/0149604 | A1 | 6/2008 | Varriano-Marston et al. |
| 2008/0190512 | A1 | 8/2008 | Borchardt |
| 2008/0254170 | A1 | 10/2008 | Darin |
| 2008/0310770 | A1 | 12/2008 | Turvey et al. |
| 2010/0040310 | A1 | 2/2010 | Turvey |
| 2010/0224508 | A1 | 9/2010 | Yuyama et al. |
| 2011/0211773 | A1 | 9/2011 | Romeo et al. |
| 2011/0262589 | A1 | 10/2011 | Safarik |
| 2012/0128835 | A1 | 5/2012 | Lyzenga et al. |
| 2013/0284738 | A1 | 10/2013 | Haimi |
| 2014/0029873 | A1 | 1/2014 | Cruz et al. |
| 2014/0065356 | A1 | 3/2014 | Chow et al. |
| 2015/0102022 | A1 | 4/2015 | Crable et al. |
| 2015/0122818 | A1 | 5/2015 | Bruna |
| 2015/0123317 | A1 | 5/2015 | Sorem et al. |
| 2015/0306704 | A1 | 10/2015 | Sohn et al. |
| 2016/0185501 | A1 | 6/2016 | Hansen |
| 2016/0340085 | A1 | 11/2016 | Pettis et al. |
| 2017/0247159 | A1 | 8/2017 | Hansen |
| 2017/0320169 | A1 | 11/2017 | Klann |
| 2017/0349348 | A1 | 12/2017 | Tzu |

FOREIGN PATENT DOCUMENTS

| | | | | |
|---|---|---|---|---|
| EP | 1893490 | A4 | 8/2009 | |
| EP | 2272661 | A1 | 1/2011 | |
| EP | 2824039 | A1 | 1/2015 | |
| WO | 1988007479 | A1 | 10/1988 | |
| WO | WO-8807479 | A1 * | 10/1988 | ............. B65D 33/01 |
| WO | 2015004221 | A1 | 1/2015 | |

OTHER PUBLICATIONS

Amit Agrawal, A Comprehensive Review on Gas Flow in Microchannels, Jul. 2013, Researchgate, vol. 2—No. 1—2011, 40 pages, Indian Institute of Technology Bombay, Department of Mechanical Engineering, Mumbai, India.

Halwidl, D, Development of an Effusive Molecular Beam Apparatus, Apr. 7, 2016, Springer, Chapter 2, "Flow of Gases".

Lijo et al, Effects of Choking on Flow and Heat Transfer in Micro-channels, Nov. 14, 2011, Sciencedirect, vol. 379, Issue 38, International Journal of Heat and Mass Transfer 55 (2012), pp. 701-709, School of Mechanical Engineering Andong National University, Andong 760-749, Republic of Korea.

O.I. Rovenskaya, Computational Study of 3D Rarefied Gas Flow in Microchannel With 90 Bbend, Apr. 29, 2016, Sciencedirect, vol. 59, European Journal of Mechanics B/Fluids 59 (2016), pp. 7-17, Dorodnicyn Computing Centre, Federal Research Centre "Computer Science and Control" of Russian Academy of Sciences, Vavilova st. 40, 119 333 Moscow, Russia.

Pugmire et al, Surface Characterization of Laser-Ablated Polymers Used for Microfluidics, Jan. 9, 2002, ACS Publications, Anal. Chem. 2002, 74, 871-878, National Institute of Standards and Technology, Gaithersburg, Maryland 20899, and Center for Microanalysis of Materials, University of Illinois at UrbanaChampaign, Urbana, Illinois 61801.

Shan et al, On Mechanisms of Choked Gas Flows in Microchannels, Jul. 29, 2015, Sciencedirect, vol. 379, Issue 38, Physics Letters A 379 (2015), pp. 2351-2356, Department of Engineering Mechanics and CNMM, Tsinghua University, Beijing 100084, China.

Wang, Understanding the Formation of $CO_2$ and its Degassing Behaviours in Coffee, May 1, 2014, Thesis, The University of Guelph, Ontario, Canada.

White et al, A DSMC Investigation of Gas Flows in Micro-channels With Bends, Nov. 6, 2012, Sciencedirect, vol. 71, pp. 261-271, Department of Mechanical and Aerospace Engineering, University of Strathclyde, Glasgow G1 1XJ, UK.

Xiao-Dong Shan et al, Effective Resistance of Gas Flow in Microchannels, Apr. 2, 2013, Researchgate, vol. 2013, Advances in Mechanical Engineering vol. 2013, Article ID 950681, 7 pages, Department of Engineering Mechanics and CNMM, Tsinghua University, Beijing 100084, China.

* cited by examiner

MICROCHANNEL DEVICE FOR CONTROLLING GAS, VAPOR, PRESSURE WITHIN A PACKAGE

This application claims priority from provisional application No. 62/617,542, filed Jan. 15, 2018, the entire contents of which are herewith incorporated by reference.

BACKGROUND

Many perishable food items packaged in flexible packaging films are subject to pressure buildup from off-gassing or subject to spoilage from improper levels of oxygen or water vapor. To remedy these issues, several methods and devices have been utilized, including micro-perforating the packaging film or applying one-way valves.

SUMMARY

Embodiments disclosed herein address these issues by disclosing the device which has micro-channels that precisely control the pressure or flow of gases from a package, to a fine resolution, thus regulating pressure build-up in the package or minimizing harmful effects of unwanted gases or vapors in the package.

BRIEF DESCRIPTION OF THE DRAWINGS

In the Drawings:

FIG. 11 C shows multiple feeder breaches and channel; and

DETAILED DESCRIPTION

The inventor realized that the feasible lower limit to a micro-perforation in common packaging film is roughly 50 micrometers in diameter. This limits the variety of venting that can be done in microperforated packages.

Valves can also be used in flexible packaging; however they have several drawbacks in that they need to be applied to the packaging film during the forming and filling process, have an inherent cracking pressure that requires a minimum pressure buildup of the package, and allow all gases to flow unrestricted through the valve.

Micro-channels are more consistent in performance in both oxygen transfer rate ("OTR") and flow than perforations, since perforations are more subject to clogging.

A micro-channel restricts the flow of air with respect to its cross-sectional area and length. When there is no pressure differential between the two ends of a microchannel, the flow is near zero and diffusion of gases is primarily affected by relative concentrations of the gases on either end of the microchannel. Gas flow through the microchannel and a micro-perforation of a known diameter can be measured at different pressures.

A micro-channel, or set of micro-channels, can be constructed to have an equivalent flow of a micro-perforation from over 200 micrometers diameter to less than the lower extreme of 0.01 micrometers diameter.

Figure 1:
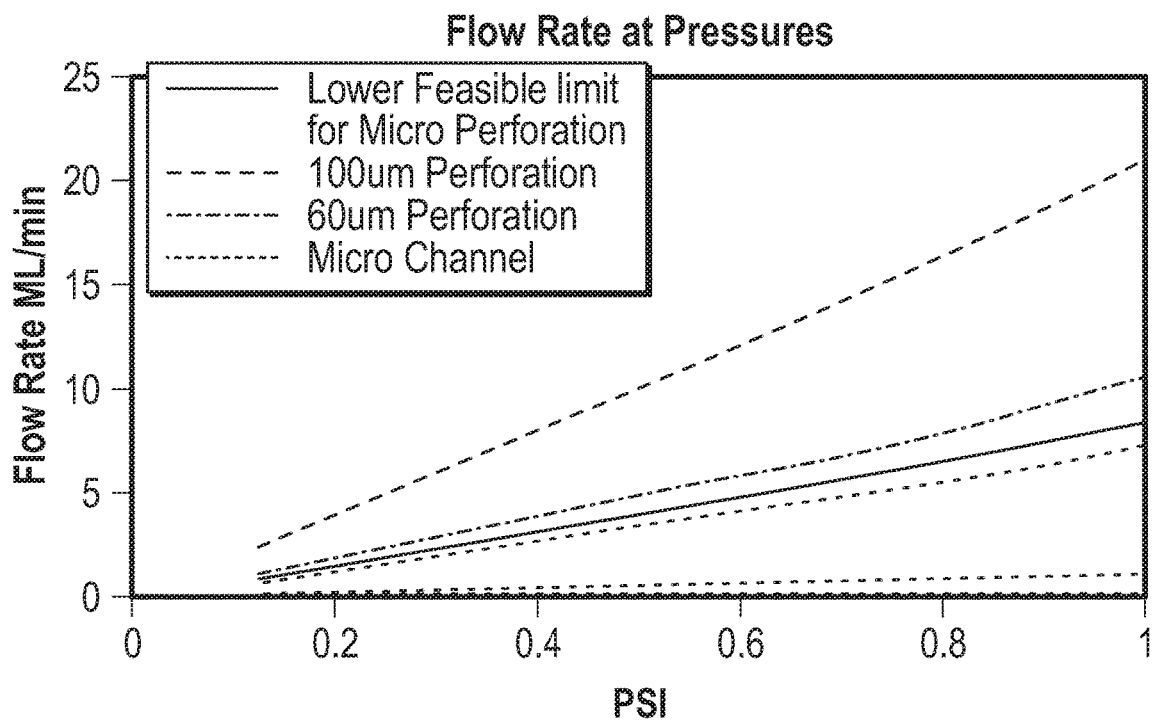
FIG. 1 shows a flow rate diagram between flow rate and PSI for different micro-channels and perforation.

FIG. 1 shows a graphical relationship between microchannels, perforations, PSI and flow rate. This shows the channels that are designed to meet the venting requirements of a package enabling a lower overall Oxygen Transmission Rate (OTR) as the venting requirements are usually much lower than the smallest feasible perforation. FIG. 1 shows a relationship to both the OTR and flow at a given pressures can be drawn for both micro-perforations of various diameters and micro-channels of various flow rates. A microperforation with the equivalent flow as a micro-channel has an OTR that is 5 to 10 times higher.

Figure 2:
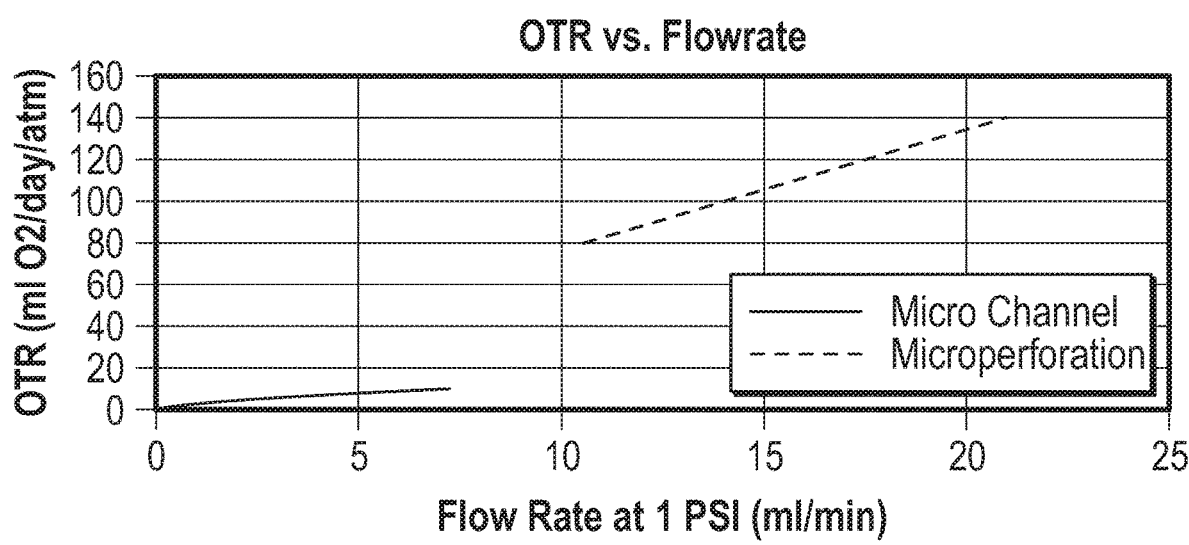
FIG. 2 shows a flow rate versus OTR graph for microperforations in microchannel.

FIG. 2 illustrates an advantage of a micro-channel having a lower OTR for a given flow rate, which can extend the shelf life of certain oxygen-sensitive products. The OTR of micro-channels is near zero while the product is off-gassing, since the diffusion of oxygen into the package is blocked by the counter flow of gas though the channels.

The effective diameter and length of a channel can be set to affect the flow of the gas type that is preferentially allowed to pass. For example, carbon dioxide gas generally flows through tubes in gas column chromatography at a faster rate than oxygen or aromatic compounds. A channel that has a small effective diameter would allow carbon dioxide though at a faster rate than oxygen or aromatic gas molecules. In this manner, the gas within the package can be altered by the device, retaining aromatic compounds and reducing oxygen infiltration while allowing a higher relative flow of carbon dioxide. The smaller effective diameter of the channels would restrict flow and may tend to allow pressure build up which could be countered by adding more channels to the device.

Special constructions of a micro-channel device can also be designed. For example, the micro-channel can include a hydroscopic compound to effectively lower the OTR or gas transmission after pressure equalization, thus extending the shelf life of the packaged product. If the product that is off-gassing has a low water vapor concentration, the flow of gas can be used to keep a hydroscopic compound from absorbing water from the outside air into the package. When the flow of a dry gas stops water vapor from outside the package, the water can infiltrate the hydroscopic compound, swelling it and effectively sealing the channels.

In summary, micro-channels can be used to precisely control the OTR of a package for the extension of shelf life for fresh produce, enabling better control of OTR and other gases than micro-perforated film. In addition, micro-channels also have a lower tendency to clog due to particles or water vapor infiltration.

Venting microwavable frozen foods packaged in flexible packaging film can also benefit from the use of microchannels in that the flow of steam can be tightly controlled during heating and have a lower OTR than micro-perforated film. The use of the micro-channel device will extend the viable shelf life for frozen, refrigerated, and other micro-waveable products.

Modified Atmosphere Packaging (MAP) or hermetically sealed flexible packages transported over mountains or in airplanes can experience large changes in atmospheric pressure. These products will benefit from micro-channels in that the pressure build-up and subsequent under-pressure when returning to higher atmospheric pressures is automatically handled by using the micro-channel device.

Palletization of products filled in flexible packaging will benefit from micro-channels in that the air trapped in the package will be allowed to escape without compromising the package's OTR or allowing micro-organisms into the package. Advantages to a denser pallet or container yields lower overall shipping costs in that the number of packaged products on a pallet will be higher.

Flexible packages that incorporate the use of micro-channel devices may also see a reduction in the use of packaging film. The volume of the package can be reduced is the package design incorporates addition head space for product off-gassing. Packaging material may also be reduced in that the overall thickness can be reduced because of lower pressures or the need for additional film thickness to support the mechanical attachment of a welded type valve.

The added benefit of keeping debris, liquid and micro-organism out of a package is also seen with micro-channels. The area of a cross-section of the channel can be roughly of the same as a micro-perforation but because of its length the likelihood of contamination is much lower than a micro-perforated through hole.

According to an embodiment, a laser can be used to create micro-channels by removing material in multilayer film constructions. A 1$^{st}$ embodiment is shown with reference to FIG. 3. Different materials reflect or absorb laser light of various frequencies (wavelengths) at different amounts. A material can absorb 100% of the laser light which affects the surface exposed to the laser light and not the material below. The other extreme is near 0% absorbency to laser light, which allows the laser light to pass through the material with no affect. In the ranges between the extremes, a level of heating comes from the surface exposed to the laser light to the other side of the material.

Figure 3:
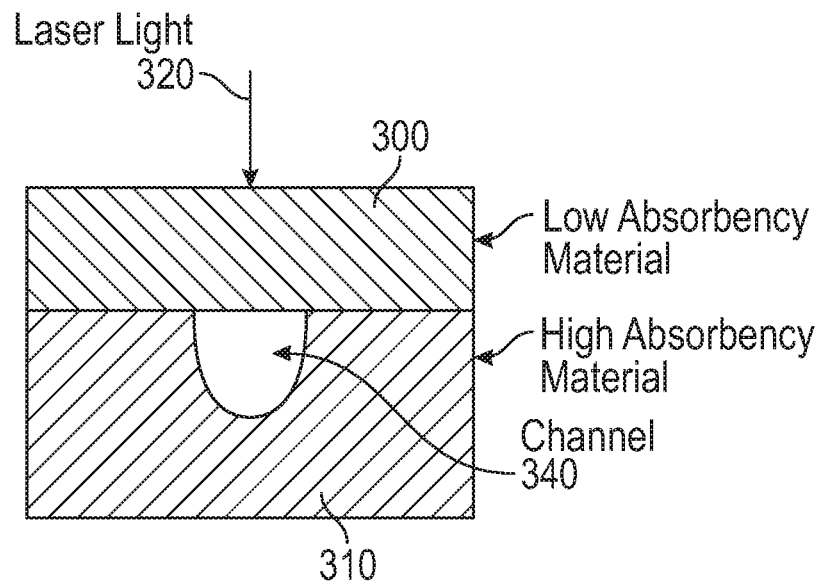
FIG. 3 shows a channel formed between a low absorbency layer and a high absorbency layer.

According to an embodiment shown in FIG. 3, a low laser absorbency material 300 is layered over a high laser absorbency material 310 from the direction of incoming laser light 320. The material made in this way allows the higher absorbency material 310 to be ablated (vaporized) without directly affecting the first or lower absorbency material. This leaves a channel 340 formed where the laser has ablated the material.

Figure 4:
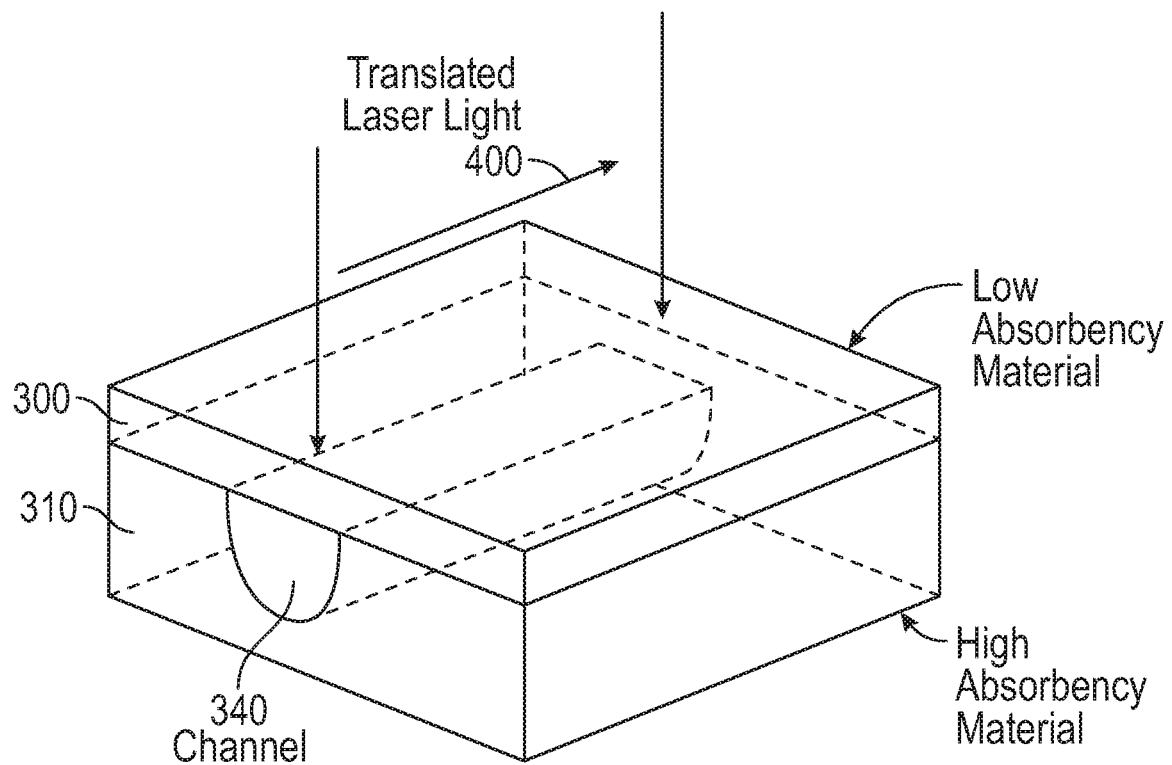
FIG. 4 shows how the channel can be formed along the line from formed from a translated laser light.

FIG. 4 illustrates how the channel 340 is formed along a path along which the laser beam is translated to form the axis of the channel. The channel is formed under the low absorbency material 300 in the surface of the high absorbency material 340, and is formed along the direction of translation 400 of the laser light.

The cross-sectional area of the channel is determined by several factors. The depth of the channel is affected mostly by the laser power and speed of the translation and how the laser affects the relatively high absorbency material. The width of the channel is mostly affected by the focused spot size of the laser and less so by the material and speed.

Figure 5:
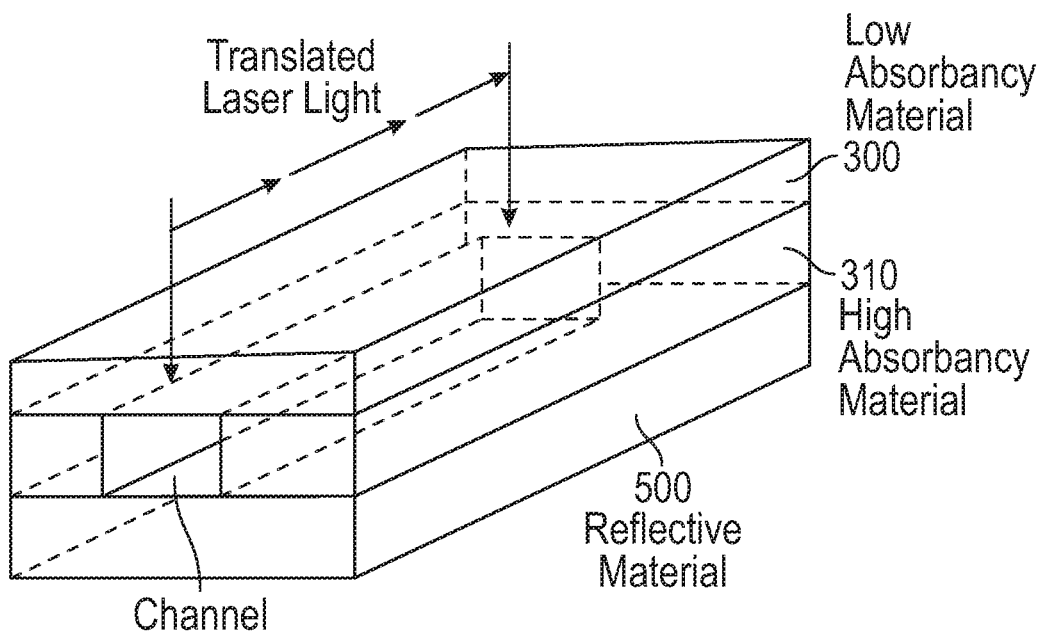
FIG. 5 shows an alternative embodiment where the channel is formed constrained between 2 layers.

FIG. 5 shows an alternative embodiment, in which the depth of the channel can be controlled by layering a third material 500 with respect to the direction of the laser that is reflective or impervious to the frequency of the laser being used. The reflective nature of this third layer 500 allows the high absorbency material 310 to be completely removed between the first layer 300 and third layer 500.

Figure 6:
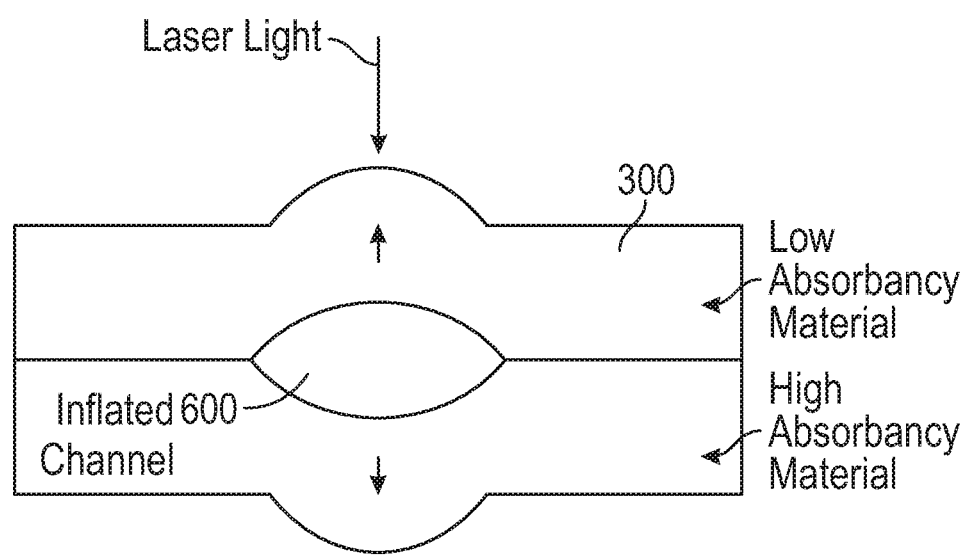
FIG. 6 shows another alternative embodiment in which an inflated channel is formed.
Figure 7:
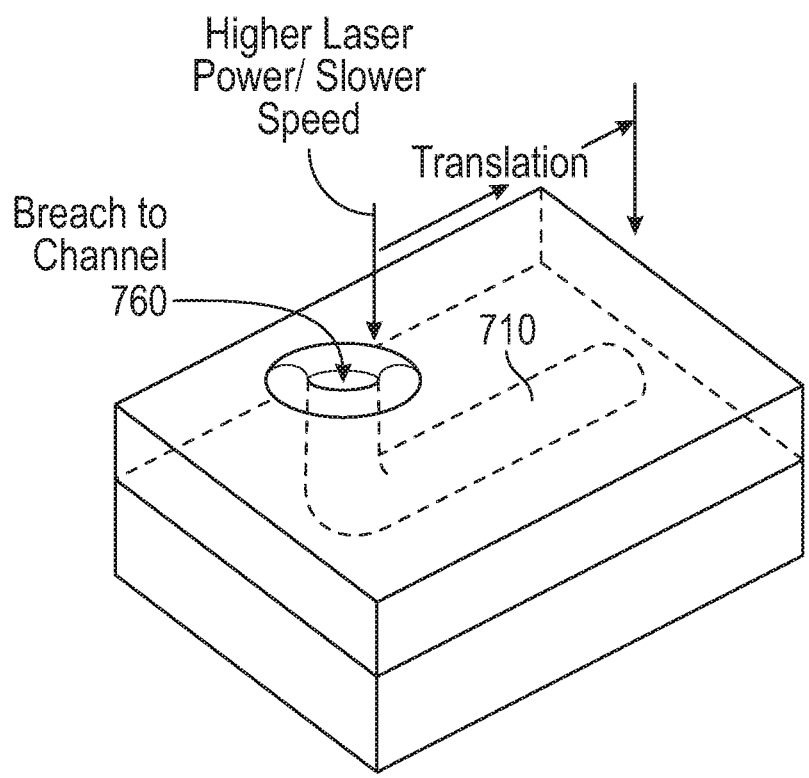
FIG. 7 shows how breach can be formed to the channel.

Forming a breach from the laser side surface of the film construction to the channel can be accomplished by increasing the laser power or decreasing the speed of the laser to the point that the additional power heats and either perforates the relative low absorbency film 300 or heat softens the film 300 to the point that the vapor generated by the ablation in the high absorbency layer 310 expands the low absorbency layer 300, or bursts though it. This forms an inflated channel 600 in areas where the low adsorbancy layer has been softened and expanded. The high absorbency material can also be expanded, as shown in FIG. 6, or can be inflated by the pressure caused by ablation of the high absorbency material.

The breach 700, which provides access to the channel 710, can be any of the channels in any of the embodiments. The breach 700 forms the entrance/exit point that allows gas to pass through the channel 710. The channel can be formed by increasing the laser power at the point of the channel, causing punch through of the low absorbency material 300 due to the increased laser power. Alternatively the laser can be slowed or stopped at the point where the breach is desired, to cause the breach 700 to be formed.

Figure 8:
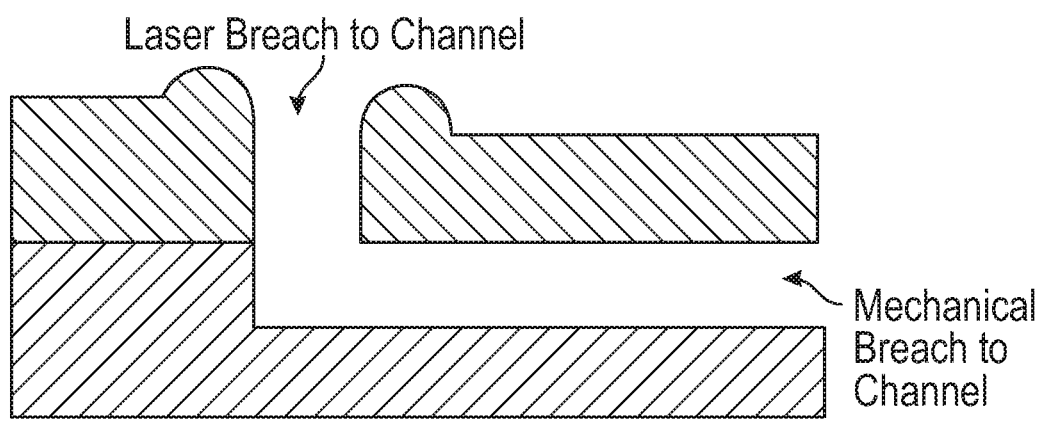
FIG. 8 illustrates how a mechanical breach to the channel can be formed.

Alternatively, the channel or breach can be mechanically cut as shown in FIG. 8. The mechanical cutting can use a laser, or a punch or some other cutting structure.

The dimensions of a micro-channel are roughly from a width of 1 micrometers to 400 micrometers or larger and a depth of 1 to 400 micrometers or more. The flow for a micro-channel is dependent on the cross-section area and length. For example, a channel of roughly 100 micrometers wide by 25 micrometers in depth and 7 millimeters in length has a flow rate of 1 ml of air per minute at about 6,900 Pascal (1 PSI) pressure difference from one end of the channel to the other. A device that has two or more channels is additive to the two independent channels' flow rates. OTR of channels is also additive.

Figure 9:
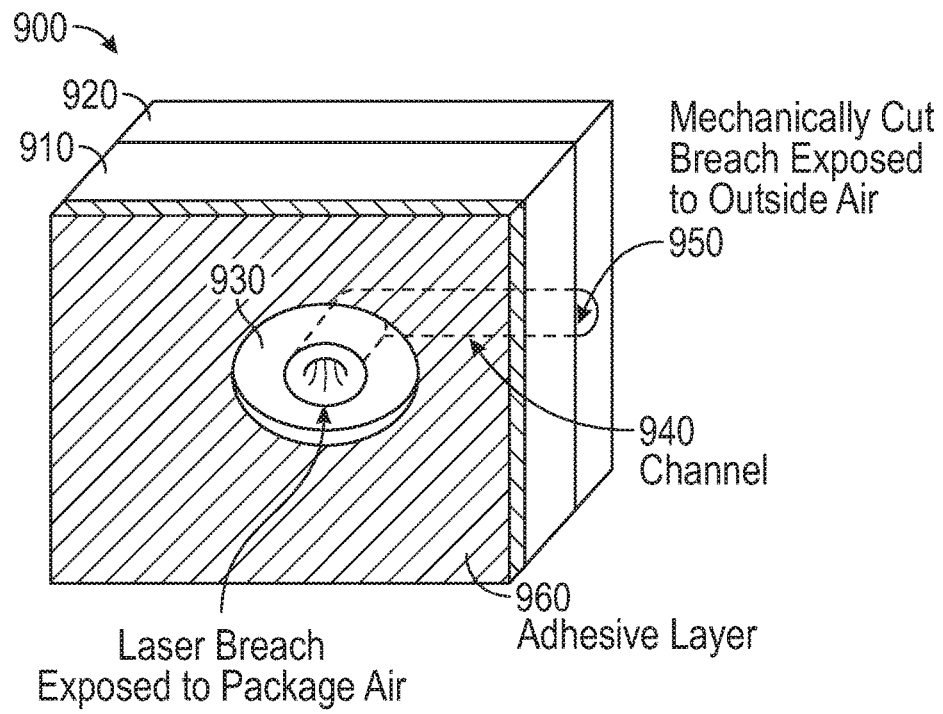
FIG. 9 shows how the structure can be formed onto a multilayer structure with an adhesive layer and can be used as a patch on the package.

The micro-channels can be created directly on the Packaging film. However, a preferred method comprises a device as shown in FIG. 9, constructed of a multilayer film 900 including a low absorbency material 910 and a higher absorbency material 920. The film includes at least one breach and the channel. In the FIG. 9 embodiment, there is a laser-formed breach 930 that exposes the channel 940 to package air. There is also a mechanically cut breach 950 that is exposed to outside air. This film can have an adhesive layer 960, thus forming an adhesive patch which will be applied onto the Packaging film. The adhesive can be constructed to isolate the breach(es) such as 930 which are exposed to package air, from the outside air.

Figure 10:
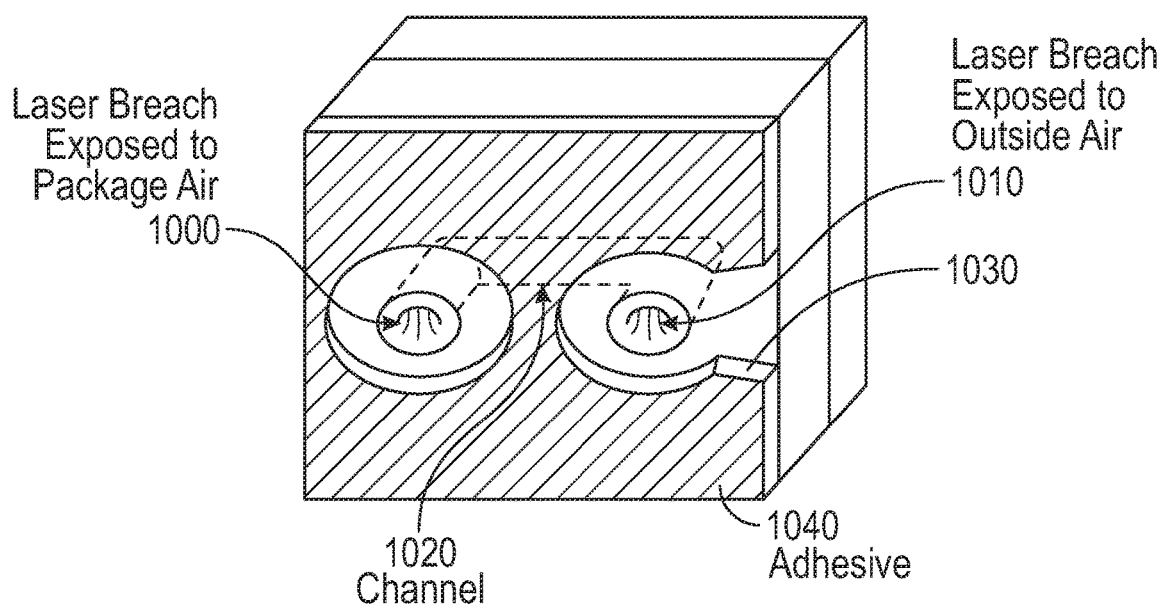
FIG. 10 illustrates an alternative design in which both breaches are on the same surface.

FIG. 10 shows an alternative embodiment where both breaches 1000 and 1010 are laser formed, and the channel 1020 between the breaches is also laser formed. The breach 1000 is exposed to the package air by virtue of being placed in a location where it is exposed to the package air. The breach 1010 is connected to the breach 1000 by the channel 1020. The breach 1010 is exposed to the outside air by virtue of a cut out portion 1030 in the adhesive layer 1040. In this way, the breach 1000 is located in a location where it will be exposed to the package air, and automatically vented through the channel 1020 to the breach 1010 to the cut out portion 1030. The gases in the package are exposed to the breach isolated by the adhesive by a perforation via laser or mechanical punch in the packaging film within the adhesive perimeter.

Figure 11A:
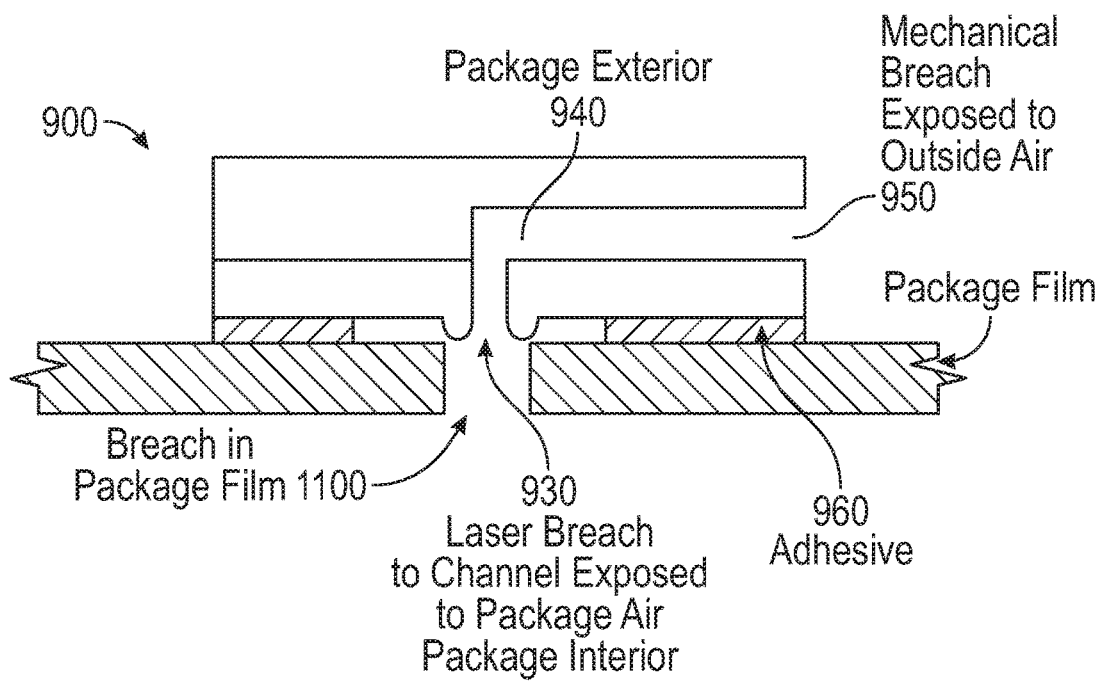
FIG. 11A shows a cross section showing how mechanical breach can be exposed to the outside air.
Figure 11B:
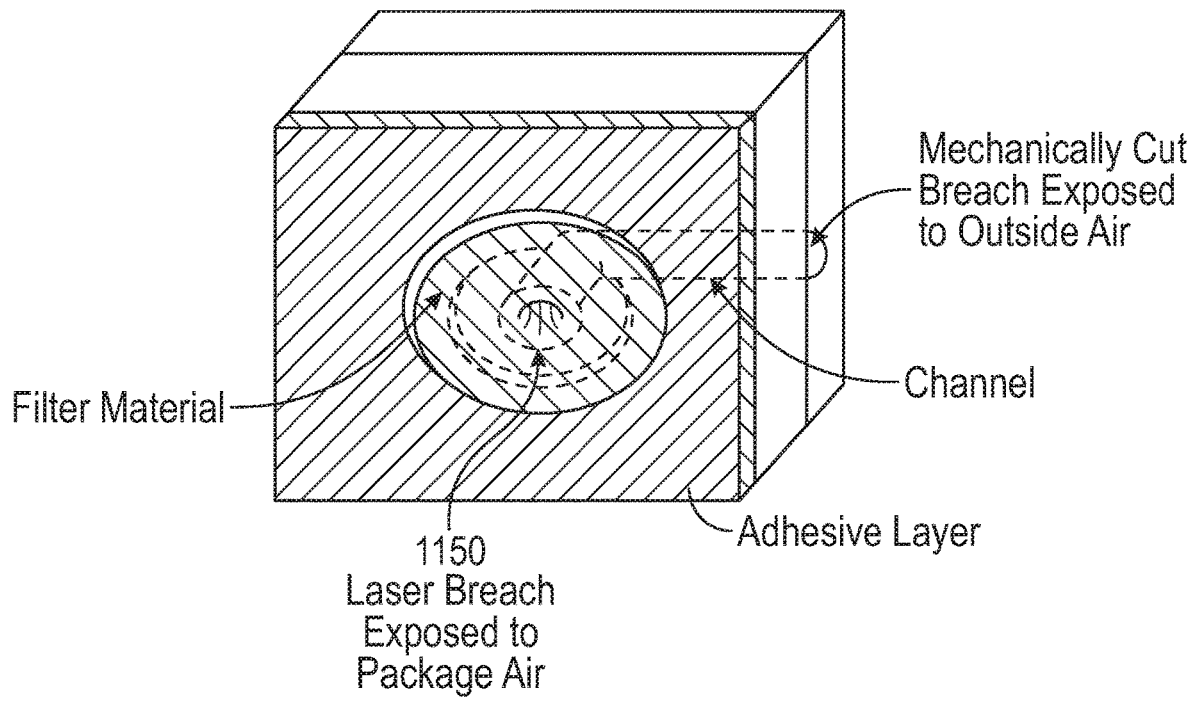
FIG. 11 B shows a filter material included in the laser breach.
Figure 11C:
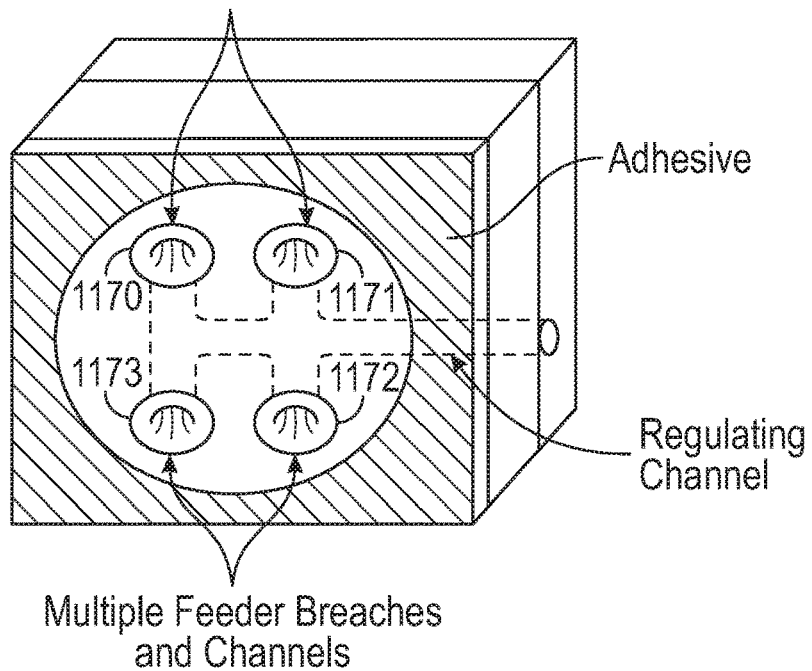

FIG. 11 shows a cross section illustrating how the multilayer structure 900 of FIG. 9 can be placed over a breach 1100 in the packaging film. The multilayer structure must be placed with its breach 930 in a location in registry with the breach 1100 in the package film. The adhesive 960 seals around the two breaches 1100 and 930. The breach in the package film extends through the channel 940 and exhausts through the mechanically cut breach 950 to the outside air.

In this manner the packaging film used for the construction of the package is independent of the film construction utilized on the patch with channels and breaches. This is advantageous as the multilayer film that the patch is made of is generally more expensive than many common packaging films.

FIG. 11 B illustrates how a filter can be incorporated into the device between the perforation in the packaging film (such as 1100 in FIG. 11) and the interior channel. This filter 1150 operates to block debris from entering the channel and blocking or restricting the flow of gases thru the device.

In one embodiment, the filter can be constructed of a hydrophobic material that blocks liquid from passing through while allowing vapor and gas to pass. In this manner the channels would remain free of liquid, since the liquid could otherwise prevent proper function.

FIG. 11 C illustrates an embodiment where multiple "feeder" channels 1170, 1171, 1172 and 1173 can be used to allow gas to enter a channel that is designed to regulate the flow and OTR of the device. The multiple entry channels could be larger in effective diameter and shorter in length than the regulating channel 1175, and would not affect the overall flow and OTR characteristics of the device and would serve as a redundancy if any of the feeder channels became blocked. These channels can have a tight crossing pattern that serve as an area for debris to settle before being allowed into the regulating channel, since debris in the regulating channel can affect performance.

Another embodiment incorporates an airway that seals after being exposed to water vapor or humidity. The gases that are generated by some products have very low humidity. If these products off-gas for a given period after packaging (i.e. fresh roasted coffee), then venting to prevent bloating is not necessary after this given period. The ability to vent after the period of off-gassing may allow oxygen to enter the package and shorten the shelf life of the product. This embodiment seals the venting after allowing the venting to continue for a time.

Figure 12:
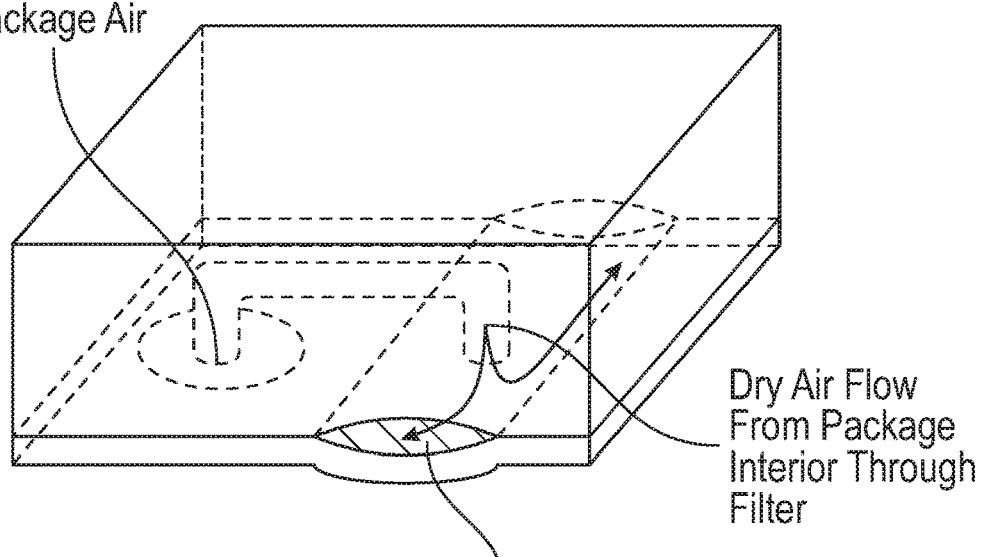
FIG. 12 shows a dry filter used in the breach.

FIG. 12 illustrates a device that forces off-gas to flow thru a "dry filter" 1200, where the filter is impregnated with hydroscopic compound. This dry filter 1200 would not alter flow while the gases are below a water vapor or humidity level that would affect the hydroscopic compound. After the off-gassing cycle is complete the dry flow of air would no longer isolate the hydroscopic compound from the higher humidity atmosphere. FIG. 12 When exposed to atmospheric humidity, the compound would swell, liquefy or dissolve in adsorbed water. In each of these cases, the filter would effectively block passage of atmospheric air to the interior of the package. FIG. 12 Blocking outside air from the interior of the package would extend the shelf life of the product. Caution should be taken to prevent the device from absorbing humidity prior to filling and dry off-gassing from maintaining functionality.

While the product is off-gassing the channels would effectively block oxygen and water vapor from entering the package thus the OTR of the device would essentially be zero.

Valves that are used to control bloating due to off-gassing generally have a cracking pressure and allow a high rate of gas to be expelled from the package once the cracking pressure is reached or exceeded. The mechanical valves can re-seat once the gas expelled, lowering the pressure bellow the cracking pressure. During the reseating process many of the valves allow atmospheric air to enter the package which raises the oxygen levels within the package shortening the shelf life. Since these embodiments do not use valves of this type, Preferred method and Process Sequence A process for forming the patches is described herein.

A first step is to manufacture the adhesive patches which contain the breaches and channels created with laser technology. The patches come in a roll format with a silicon coated carrier liner protecting the adhesive. Then the packaging film is mechanically or laser perforated in registration with the print and the adhesive patch is applied to the outer surface of a packaging film, usually in registration with the mechanical or laser perforation on the packaging film, while the web of packaging film is moving. An inline mechanical or laser perforator and a label applicator are used to perform these two steps. A label applicator usually consists of a label unwind, print registration sensor, label removal mechanism, application roller, and liner rewind. The roll of patches runs through the label applicator, the patches get released and applied to the outer surface of the packaging film, and the carrier liner is rewound. The packaging film also comes in a roll format, and therefore is unwound and rewound continuously. The packaging film has printed registration marks to allow for accurate perforation and application of the patches in registration with the printed graphics on the packaging film. Once the patch is applied, the moving web of packaging film is rewound into a finished roll. The finished roll is shipped to the customer's packaging line where usually the customer's product is place in a vertical form fill sealing machine to create the final bag.

What is claimed is:

1. A multilayer perishable food packaging structure having a microchannel therein, comprising:
   a first layer of packaging material comprising a first breach and a second layer of packaging material comprising a second breach, the first layer of packaging material having lower absorbency to laser light of a given frequency than the second layer of packaging material,
   wherein the second layer of packaging material further comprises a laser-ablated microchannel in communication with the first breach and the second breach, the laser-ablated microchannel comprising dimensions configured to enable carbon dioxide to flow through at a faster rate than oxygen or aromatic gas molecules.

2. The multilayer structure of claim 1, further comprising wherein the laser-ablated microchannel is further configured to have a flow of air equivalent to a micro-perforation of 200 micrometers in diameter to 0.01 micrometer in diameter.

3. The multilayer structure of claim 1, further comprising wherein the dimensions of the laser-ablated microchannel comprise a width of 1 micrometer to 400 micrometers.

4. The multilayer structure of claim 1, further comprising wherein the dimensions of the laser-ablated microchannel comprise a depth of 1 micrometer to 400 micrometers.

5. The multilayer structure of claim 1, further comprising wherein either of the first breach or the second breach comprises a laser formed breach.

6. The multilayer structure of claim 1, further comprising wherein either of the first breach or the second breach comprises a mechanically cut breach.

7. The multilayer structure of claim 1, further comprising a third layer of packaging material that is laser reflective to the laser light of the given frequency.

8. The multilayer structure of claim 1, further comprising wherein the laser-ablated microchannel is inflated and expanded beyond an original thickness of the second layer of packaging material.

9. The multilayer structure of claim 1, further comprising wherein the multilayer structure is part of a package film, and the first breach is in communication with an interior of the package and the second breach is in communication with an exterior of the package.

10. The multilayer structure of claim 9, further comprising wherein the laser-ablated microchannel dimensions are further configured to have an OTR of near zero when a product is within the interior of the package and is off-gassing through the laser-ablated microchannel.

11. The multilayer structure of claim 1, further comprising an adhesive on the first layer of packaging material surrounding the first breach.

12. The multilayer structure of claim 11, further comprising wherein the multilayer structure is adhered to the film of a package such that the first breach is in airtight communication with a breach in the film of the package.

13. The multilayer structure of claim 12, further comprising wherein the first breach is in communication with an interior of the package and the second breach is in communication with an exterior of the package.

14. The multilayer structure of claim 13, further comprising wherein the laser-ablated microchannel dimensions are further configured to have an OTR of near zero when a product is within the interior of the package and is off-gassing through the laser-ablated microchannel.

15. The multilayer structure of claim 1, further comprising wherein at least one of the first breach and the second breach comprises a filter.

16. The multilayer structure of claim 15, further comprising wherein the filter is a hydroscopic filter that absorbs water and closes at least one of the first breach and the second breach after absorbing more than a specified amount of water.

17. A multilayer perishable food packaging structure having a microchannel therein, comprising:

a first layer of material comprising a first breach in communication with an interior of a perishable food package and a second layer of material comprising a second breach in communication with an exterior of the perishable food package, the second layer of material further comprising a laser-ablated microchannel in communication with the first breach and the second breach, the laser-ablated microchannel configured to have a flow of air equivalent to a micro-perforation of 200 micrometers in diameter to 0.01 micrometer in diameter, and to enable carbon dioxide to flow through at a faster rate than oxygen or aromatic gas molecules.

* * * * *